United States Patent

Salvatore

[11] Patent Number: 5,794,892
[45] Date of Patent: Aug. 18, 1998

[54] CRITICAL NUTATION DAMPLING ON SPINNING BODIES VIA MOMENTUM WHEELS OR SIMILAR DEVICES

[75] Inventor: Jeremiah O. Salvatore, Redondo Beach, Calif.

[73] Assignee: Hughes Electronics, Los Angeles, Calif.

[21] Appl. No.: 548,158
[22] Filed: Oct. 25, 1995
[51] Int. Cl.⁶ ............................. B64G 1/28; B64G 1/38
[52] U.S. Cl. ........................ 244/165; 244/170; 244/171
[58] Field of Search .......................... 244/158 R, 164, 244/165, 170, 171

[56] References Cited

U.S. PATENT DOCUMENTS

| | | | |
|---|---|---|---|
| 3,591,108 | 7/1971 | Perkel et al. | 244/165 |
| 4,193,570 | 3/1980 | Hoffman et al. | 244/165 |
| 4,858,858 | 8/1989 | Bruederle | 244/165 |
| 5,012,992 | 5/1991 | Salvatore | 244/165 X |
| 5,269,483 | 12/1993 | Flament | 244/169 X |

Primary Examiner—William Grant
Attorney, Agent, or Firm—Elizabeth E. Leitereg; Terje Gudmestad; W. K. Denson-Low

[57] ABSTRACT

A method and system of damping nutation of a spacecraft (20) having a desired spin axis along a first principal inertia axis utilizes a momentum source (28) oriented along a second principal inertia axis perpendicular to the first principal inertia axis. An angular rate of the spacecraft (20) is sensed along an axis transverse to both the first principal inertia axis and the second principal inertia axis. An angular rate signal representative of the angular rate is generated. The angular rate signal is processed to form a control signal representative of a desired torque to drive the momentum source. The desired torque has a first additive component proportional to a derivative of the angular rate to critically damp the nutation under an at least second order model of the spacecraft (20). The momentum source (28) is driven in dependence upon the control signal. Preferably, the desired torque has a second additive component proportional to a momentum stored in the momentum source (28) to inhibit a conversion of the nutation into a tilt of the desired spin axis.

17 Claims, 5 Drawing Sheets

CRITICAL NUTATION DAMPING ON SPINNING BODIES VIA MOMENTUM WHEELS OR SIMILAR DEVICES

TECHNICAL FIELD

This invention relates to methods and systems for damping nutation in a spacecraft.

BACKGROUND ART

Many types of spacecraft, such as geosynchronous communication satellites, spin about either a maximum moment of inertia axis or a minimum moment of inertia axis during transfer orbit operations. The purpose is to take advantage of spin stability of spacecraft while satisfying thermal and power constraints. A number of disturbance torques, which can be caused by incremental velocity or spin speed change maneuvers, for example, can alter the attitude of the spacecraft. More specifically, these disturbance torques can induce nutation in the spacecraft.

If the spin of the spacecraft is about the maximum moment of inertia axis, an induced nutation will eventually damp out due to spacecraft flexibility. However, a high magnitude and/or slow decay rate of nutation interferes with attitude determination and a resulting mission timeline. In order to accelerate the decay of nutation, the spacecraft may utilize thruster control or nutation dampers.

If the spin of the spacecraft is about the minimum moment of inertia axis, any induced nutation will increase due to spacecraft flexibility. Continuous thruster control is typically employed to limit nutation, which can grow rapidly in this case, to a predetermined threshold.

Two known approaches to nutation damping utilize a motion sensor whose sensitive axis is perpendicular to the spin axis of the spacecraft body, a flywheel having an axis of rotation perpendicular to the spin axis and perpendicular to the sensitive axis, and a motor for driving the flywheel to attenuate nutation.

A first of these approaches is disclosed in U.S. Pat. No. 4,193,570 to Hoffman et al. This approach utilizes an angular accelerometer as the motion sensor, and detects zero crossover points of a signal representative of the acceleration sensed thereby to determine its sign. Full motor torque is commanded to rotate the flywheel in a direction dependent on whether the signal exceeds a predetermined positive threshold or a predetermined negative threshold. The bang-bang control system which results acts to damp nutation at a linear rate to a preset non-zero threshold at which time the closed-loop control no longer applies.

A second approach to nutation damping is disclosed in U.S. Pat. No. 3,591,108 to Perkel et al. This approach employs a motion sensor such as a rate gyro or accelerometer to measure the angular rate about the sensitive axis, and detects when the angular rate exceeds a predetermined positive threshold or a predetermined negative threshold. Depending on which of the two thresholds is exceeded, a full flywheel speed is commanded in one of two directions of rotation.

Since the sensitive axis angular acceleration and velocity due to nutation are sinusoids differing by 90 degrees in phase, the commanding of full speed is substantially the same as the commanding of full torque as in Hoffman et al. Consequently, a similar linear nutation decay rate results in either approach. Further, both approaches damp nutation to a non-zero threshold level.

SUMMARY OF THE INVENTION

It is thus an object of the present invention to provide a method for damping nutation of a spacecraft spinning about either the maximum moment of inertia axis or the minimum moment of inertia axis which damps nutation substantially to zero.

Another object of the present invention is to provide a method for damping nutation of a spacecraft spinning about either the maximum moment of inertia axis or the minimum moment of inertia axis which does not require use of propellant and does not perturb the orbit or angular momentum of the spacecraft.

In carrying out the above objects, the present invention provides a method of damping nutation of a spacecraft having a desired spin axis along a first principal inertia axis. The spacecraft includes a momentum source oriented along a second principal inertia axis perpendicular to the first principal inertia axis. An angular rate of the spacecraft is sensed along an axis transverse to both the first principal inertia axis and the second principal inertia axis. An angular rate signal representative of the angular rate is generated. The angular rate signal is processed to form a control signal representative of a desired torque to drive the momentum source. The desired torque has a first additive component proportional to a derivative of the angular rate to critically damp the nutation under an at least second order model of the spacecraft. The momentum source is driven in dependence upon the control signal. In a preferred embodiment, the desired torque has a second additive component proportional to a momentum stored in the momentum source to inhibit a conversion of the nutation into a tilt of the desired spin axis.

Further in carrying out the above objects, the present invention provides a system for damping nutation of a spacecraft. The system includes an angular rate sensor, a processor, and a motor-driven momentum source which performs the steps in the above-described method.

Embodiments of the present invention are advantageous in critically damping nutation to zero as long as the required motor drive control torque does not saturate. In the event of saturation, nutation damps at a linear rate until the required control torque comes out of saturation, at which time nutation damps critically to zero.

These and other features, aspects, and advantages of the present invention will become better understood with regard to the following description, appended claims, and accompanying drawings.

BEST MODE FOR CARRYING OUT THE INVENTION

Figure 1:
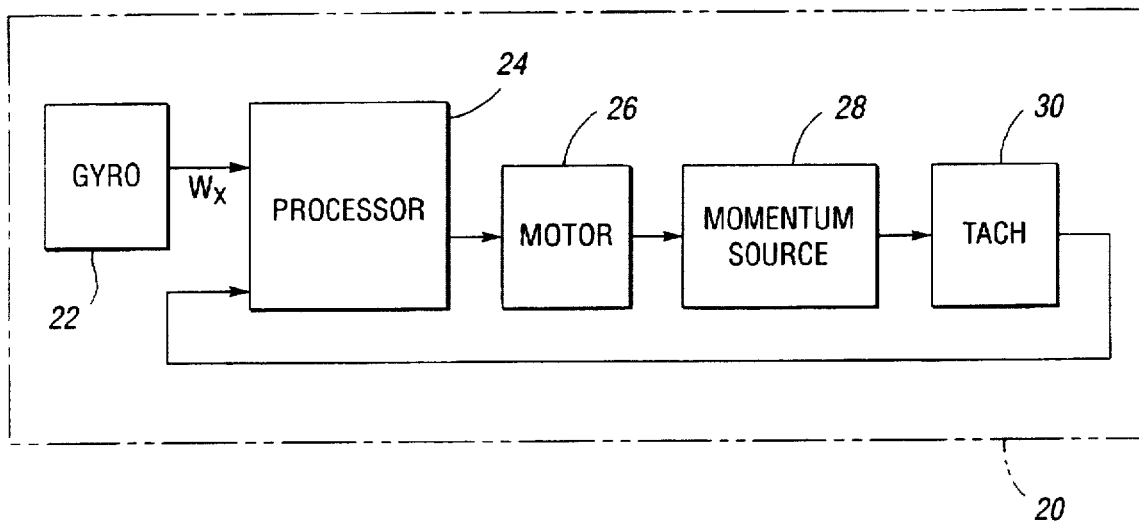
FIG. 1 is a block diagram of an embodiment of a system for damping nutation of a spacecraft.
Figure 6:
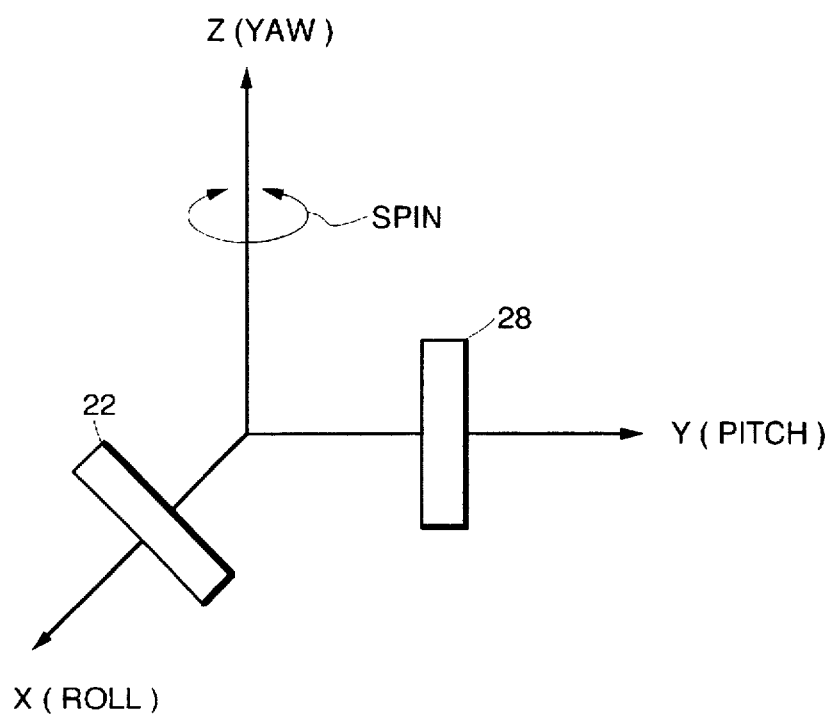
FIG. 6 is a graph illustrating the principal inertia axes.

An embodiment of a system for damping nutation of a spacecraft 20 is illustrated in FIG. 1. The spacecraft 20 is assumed to be a substantially symmetrical body which nominally spins about the Z principal axis. The spacecraft 20 includes an angular rate sensor, such as a rate gyro 22, which senses the angular rate of the body of the spacecraft 20 about a sensitive axis, and produces a sensor signal representative thereof. The sensor signal is applied to a spacecraft processor 24 which forms a control signal in dependence upon the sensor signal. The control signal is applied to a motor 26 which drives a momentum source 28 oriented perpendicular to the spin axis. The momentum source 28 may comprise a momentum wheel or flywheel, for example. In the subsequent description, it is assumed that the momentum source 28 is oriented along the Y principal axis, although the present invention is not limited thereto, such as shown in FIG. 6. A tachometer 30 senses an angular rate of the momentum source 28, and generates a signal representative thereof. The processor 24 processes the signal to compute the momentum stored in the momentum source 28.

The Euler Equations for a symmetric body nominally spinning about the Z principal axis with a momentum source perpendicular to the spin axis along the Y principal axis are:

$$\dot{\omega}_x + \Omega\omega_y - \frac{h\omega_z}{I_T} = 0 \quad (1)$$

$$\dot{\omega}_y - \Omega\omega_x + \frac{T}{I_T} = 0 \quad (2)$$

$$\dot{\omega}_z + \frac{h\omega_x}{I_z} = 0 \quad (3)$$

$$T = \dot{h} \quad (4)$$

where:

$\omega_x$, $\omega_y$, $\omega_z$ are the body angular rates about nominal principal axes X, Y, and Z;

$I_z$ denotes the spin moment of inertia;

$I_T$ denotes the transverse moment of inertia;

$\sigma = I_z/I_T$ denotes the spin-to-transverse moment of inertia ratio;

$\Omega = (\sigma - 1)\omega_z$ is the nutation frequency of the body of the spacecraft 20;

h denotes the momentum of the momentum source 28; and $T = \dot{h}$ is the rate of change of the momentum of the momentum source 28 or applied torque.

By assuming $\dot{\omega}_z$ is small and $\omega_z$ is approximately constant, equations (1) and (2) become first order linear differential equations with constant coefficients. These equations can be expressed as a single second order equation by differentiating (1) and substituting (2).

$$\ddot{\omega}_x + \Omega^2\omega_x - \frac{T\sigma\omega_z}{I_T} = 0 \quad (5)$$

This second order differential equation is readily recognized as that applicable to damped free vibration if:

$$\frac{-T\sigma\omega_z}{I_T} = 2\zeta\Omega\dot{\omega}_x \quad (6)$$

or $$T = -2\zeta \frac{|\sigma - 1|}{\sigma} I_T\dot{\omega}_x$$

Of interest is the critically damped case, i.e., where the damping ratio $\zeta=1$. In this case, the required torque for critical damping is:

$$\dot{h} = T = -2\frac{|\sigma - 1|}{\sigma} I_T\dot{\omega}_x \quad (7)$$

Choosing typical initial conditions $\omega_x(0)=\omega_T$, $\dot{\omega}_x(0)=0$ the solution to equation (5) is:

$$\omega_x(t)=\omega_T(1+|\Omega|t)e^{-|\Omega|t}$$

with $$\omega_x(t\to\infty)\to 0 \quad (8)$$

The initial transverse rate is observed to be critically damped to-zero. The angular momentum of the momentum source 28 can be determined by integrating equation (7) with an initial condition of $h(0)=0$.

$$h(t)=K\omega_T[1-(1+|\Omega|t)e^{-|\Omega|t}] \quad (9)$$

As nutation is critically damped, the wheel is observed to possess a steady state momentum given by:

$$h_\infty=K\omega_T \quad (10)$$

Equation (2) can be integrated to obtain the body rate $\omega_y$ along the axis of the momentum source 28. With an initial condition of $\omega_y(0)=0$, the body rate is given by the following equation.

$$\omega_y(t) = \omega_T\left(2 - \frac{K}{I_T}\right)(1 - e^{-|\Omega|t}) - \omega_T\left(1 - \frac{K}{I_T}\right)|\Omega|te^{-|\Omega|t} \quad (11)$$

As nutation is critically damped, the body of the spacecraft 20 is observed to take on a steady state constant rate given by:

$$w_{y_\infty} = w_T\left(2 - \frac{K}{I_T}\right) \quad (12)$$

In order to interpret these results physically, it is noted that the undamped solution prior to wheel turn-on is given by:

$$\omega_x=\omega_T\cos\Omega t$$

$$\omega_y=\omega_T\sin\Omega t$$

$$\omega_z=\omega_{z_0} \quad (13)$$

The total system angular momentum H is given by:

$$H^2=(I_z\omega_z)^2+I_T^2(\omega_x^2+\omega_y^2)=I_z^2\omega_{z_0}^2+I_T^2\omega_T^2 \quad (14)$$

The nutation (coning) angle, $\theta$, is the angle between H and the principal axis of spin. The nutation angle can be expressed by the following equation.

$$\theta \approx \frac{I_T\omega_T}{I_z\omega_{z_0}} = \frac{\omega_T}{\sigma\omega_{z_0}} \quad (15)$$

When the oscillatory transverse rates are critically damped, the steady state body rate and wheel momentum indicate the body is spinning about a new principal axis colinear with H since angular momentum must be conserved. The angle $\alpha$ between the original principal axis z, and the new spin axis or H is defined as:

$$\alpha = \frac{I_T \omega_{y\infty} + h_\infty}{I_z \omega_z} \approx \frac{2\omega_T}{\sigma \omega_{z_0}} \quad (16)$$

As nutation is critically damped, oscillatory transverse momentum is converted into a spin axis tilt, that is twice the initial nutation angle.

In order to show that total angular momentum, H, is conserved during this process, equation (3) is integrated to define the small change in spin rate required, i.e., $$I_z(\omega_z - \omega_{z_0}) = \frac{-K\omega_T^2}{|\Omega|} \left[ \frac{3}{4} - (2 + |\Omega|t)e^{-|\Omega|t} + \left( \frac{5}{4} + \frac{3}{2}|\Omega|t + \frac{\Omega^2 t^2}{2} \right) e^{-2|\Omega|t} \right] \quad (17)$$

As nutation is critically damped, the steady state spin rate about the z axis is:

$$\omega_{z_\infty} = \omega_{z_0} - \frac{3}{4} \frac{K\omega_T^2}{I_z |\Omega|} = \omega_{z_0} - \frac{3}{2} \frac{I_T^2 \omega_T^2}{I_z^2 \omega_{z_0}} \quad (18)$$

The final total system momentum is given by:

$$H^2 = (I_z \omega_{z_\infty})^2 + (I_T \omega_{y\infty} + h_\infty)^2 \quad (19)$$

$$H^2 = (I_z \omega_{z_0})^2 \left( 1 - \frac{3}{2} \frac{I_T^2 \omega_T^2}{I_z^2 \omega_{z_0}^2} \right)^2 + (2I_T \omega_T)^2$$

$$H^2 \approx I_z^2 \omega_{z_0}^2 + I_T^2 \omega_T^2$$

so that angular momentum is conserved.

The conversion of nutation into spin axis tilt during critical damping is undesirable because (i) the spacecraft spins about a new axis whose direction depends on the initial transient and (ii) part of the momentum storage capability of the wheel is consumed. The situation is rectified by feeding back a small torque that tends to oppose any buildup of wheel momentum while still allowing critical damping to take place.

Critical Nutation Damping With No Change In Spin Axis Direction or Wheel Momentum The motor torque is now defined as:

$$T = K\omega_z - kh \quad (20)$$

where K is defined by (6) and k is a small positive gain to supply the required feedback. Equations (1), (2), (3) can be expressed as:

$$\ddot{\omega}_x + 2\zeta |\Omega| \dot{\omega}_x + \Omega^2 \omega_x + \frac{k\sigma \omega_2 h}{I_T} = 0 \quad (21)$$

$$K\omega_x + \dot{h} + kh = 0 \quad (22)$$

Again assuming $\omega_z \approx$ constant, the characteristic equation for the linear system is:

$$\Delta = s^3 + s^2(2\zeta|\Omega|+k) + s\Omega^2 + k\Omega^2 = 0 \quad (23)$$

Choosing $k = \epsilon|\Omega|$, $\epsilon \ll 1$, and substituting $$\left( x - \frac{(2\zeta + \epsilon)}{3} |\Omega| \right),$$

Equation (23) reduces to:

$$x^3 + ax + b = 0 \quad (24)$$

where $$a = \left[ 1 - \frac{4\zeta}{3} (\zeta + \epsilon) \right] \Omega^2, \quad b = \frac{2}{27} (\zeta(8\zeta - 9) + (9 + 12\zeta^2)\epsilon)|\Omega|^3$$

there are three real roots if:

$$\frac{b^2}{4} + \frac{a^3}{27} \leq 0 \quad (25)$$

The equality sign applies for critical damping (two roots equal) with the roots defined by:

$$X = -2\sqrt{\frac{-a}{3}}, +\sqrt{\frac{-a}{3}}, +\sqrt{\frac{-a}{3}} \quad \text{for } b > 0$$

Solving the equality (25) for $\zeta = 1$ leads to:

$$\epsilon = 0.134, \quad a = -0.517\Omega^2, \quad b = 0.142|\Omega|^3$$

so that $$s_1 = -0.154 |\Omega|, \quad s_2 = s_3 = -0.3 |\Omega|$$

Note that $\epsilon < 0.134$ leads to three distinct real roots and corresponds to the overdamped case. On the other hand $\epsilon > 0.134$ leads to one real root and two conjugate imaginary roots and corresponds to the underdamped case; physically, the feedback to maintain initial wheel speed is too large so that nutation damping takes more than one cycle. The no feedback case, $\epsilon = 0$, leads to roots $S_1 = 0$, $S_2 = S_3 = -|\Omega|$ or the identical solution discussed previously. It is also noted from the definition of "a" above that critically damped solutions are possible when $$\zeta > \frac{\sqrt{3}}{2}$$

and the appropriate feedback $\epsilon$ is chosen.

Using Laplace transforms, the solutions to Equations (21), (22) and (2) with initial conditions:

$\omega_x(0) = \omega_T$, $\omega_x(0) = 0$, $h(0) = 0$, $\omega_y(0) = 0$ are:

$$\omega_x(s) = \frac{s(s + (2\zeta + \epsilon)|\Omega|)\omega_T}{\Delta} \quad (26)$$

$$h(s) = \frac{K\omega_T \Omega^2}{\Delta} \quad (27)$$

$$\omega_y(s) = \frac{(s + (2\zeta + \epsilon)|\Omega|)\omega_T \Omega}{\Delta} - \frac{K\omega_T \Omega^2}{I_T \Delta} \quad (28)$$

Using the final value theorem, it is readily observed that:

$$\omega_{x\infty} = h_\infty = \omega_{y\infty} = 0$$

Therefore, as nutation is critically damped, neither the wheel speed nor the body rates take on any steady state values, as desired. In order to demonstrate angular momentum is conserved during this type of process, we first observe that the solutions for $\omega_x(t)$ and h(t) in the time domain with $\zeta = 1$, $\epsilon = 0.134$ are defined as:

$$\omega_x(t) = \omega_T(-0.62e^{s_1 t} + 1.62e^{s_2 t} - 0.447|\Omega|te^{s_2 t}) \quad (29)$$

$$h(t) = K\omega_T(0.66(e^{s_1 t} - e^{s_2 t}) + 0.811\Omega I t e^{s_2 t})  \quad (30)$$

where $$s_1 = -.154|\Omega|, \; s_2 = -.3|\Omega|, \; K = \frac{2|\sigma - 1|}{\sigma} I_T$$

Substituting Equations (28) and (29) into Equation (3), integrating, and taking the limit as $t \to \infty$, one obtains:

$$I_z(\omega_{z\infty} - \omega_{z_0}) = \frac{K\omega_T^2}{4|\Omega| I} \quad (31)$$

$$\omega_{z\infty} \approx \omega_{z_0} + \frac{1}{2} \frac{\omega_T^2}{\sigma^2 \omega_{z_0}}$$

The final total system momentum is defined by:

$$H^2 = (I_z \omega_{z\infty})^2 = (I_z \omega_{z_0})^2 \left(1 + \frac{1}{2} \frac{\omega_T^2}{\sigma^2 \omega_{z_0}^2}\right)^2$$

$$H^2 = I_z^2 \omega_{z_0}^2 + I_T^2 \omega_T^2$$

so that momentum is conserved. As the nutation is critically damped, the spin speed of the body increases slightly to conserve angular momentum.

For large nutation, the torque required may greatly exceed the capability of the motor. Under such conditions, the delivered torque can be approximated as a square wave at body nutation frequency.

Given that the undamped solution is:

$$\omega_x = \omega_T \cos \Omega t$$

and the commanded torque $T_c$ is proportional to $-\omega_x$, the delivered torque can be approximated as:

$$T = \frac{4}{\pi} T_s \sin \Omega t \quad (32)$$

where $T_s$ is the motor maximum or saturated torque. The derived Euler equation (5) becomes:

$$\ddot{\omega}_x + \Omega^2 \omega_x = \frac{4}{\pi} \frac{T_s \sigma \omega_z}{I_T} \sin \Omega t \quad (33)$$

with the solution:

$$\omega_x = \left( \omega_T - \frac{4}{\pi} \frac{T_s}{K} t \right) \cos \Omega t \quad (34)$$

The solution for the wheel momentum is:

$$h = \frac{4}{\pi} \frac{T_s}{\Omega} (1 - \cos \Omega t) \quad (35)$$

Equation (34) and the corresponding solution for $\omega_y$ show that the transverse body rates decay linearly during saturated operation.

In order to demonstrate angular momentum is conserved during this process, we substitute Equations (34) and (35) into Equation (3), integrate and average over many nutation cycles to obtain:

$$I_z \Delta \omega_z = \frac{2}{\pi} \frac{T_s t}{|\Omega| I} \left( \omega_T - \frac{2}{\pi} \frac{T_s}{K} t \right) \quad (36)$$

Noting that nutation is damped, $\omega_x \to 0$ when:

$$t_\infty = \frac{\pi K \omega_T}{4 T_s} \quad (37)$$

Substituting $t_\infty$ into Equation (36) defines the total spin speed change to be:

$$\omega_{z\infty} - \omega_{z_0} = \frac{1}{2} \frac{\omega_T^2}{\sigma^2 \omega_{z_0}}$$

So that identically to Equation (31), the total system momentum is conserved. The rate of change of nutation angle, $\theta$, defined previously becomes:

$$\dot{\theta} = \frac{\omega_T}{\sigma \omega_{z_0}} = \frac{-4 T_s}{\pi K \sigma \omega_{z_0}} = \frac{-2 T_s}{\pi I_T |\Omega| I} \quad (38)$$

Figure 2:
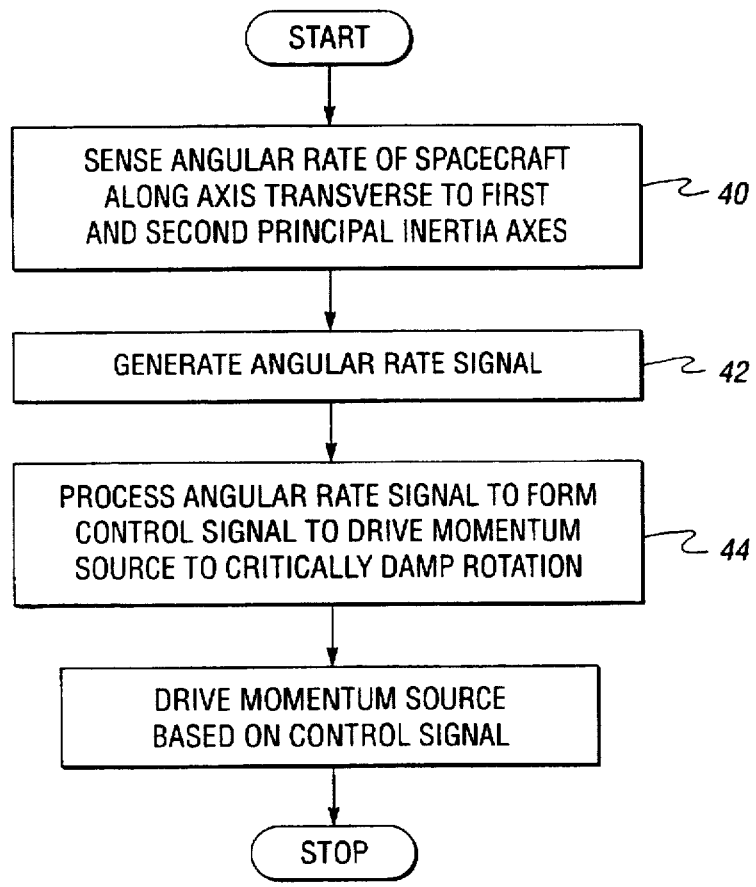
FIG. 2 is a flow chart of an embodiment of a method of damping nutation of a spacecraft.

A flow chart of an embodiment of a method of critically damping nutation of a spacecraft, based upon the above-described analyses, is illustrated in FIG. 2. The spacecraft has a desired spin axis along a first principal axis of inertia, and the momentum source is oriented along a second principal inertia axis perpendicular to the first principal axis. As indicated by block 40, the method includes a step of sensing an angular rate of the spacecraft along an axis transverse to both the first principal inertia axis and the second principal inertia axis. The method further includes a step of generating an angular rate signal representative of the angular rate $\omega_x$ as indicated by block 42.

As indicated by block 44, a step of processing the angular rate signal to form a control signal is performed. The control signal is representative of a desired torque to drive the momentum source. The desired torque has a first additive component proportional to the derivative of the angular rate, $\dot{\omega}_x$, to critically damp the nutation under a second order model of the spacecraft. In particular, for the second order model of the spacecraft given in Equation (5), the first additive component of the torque required for critical damping is given in Equation (7).

Preferably, the step of processing forms a control signal representative of a desired torque which further has a second additive component proportional to a momentum stored in the momentum source. The second additive component is operative to inhibit a conversion of the nutation into a tilt of the desired spin axis. In this preferred embodiment, the desired torque is determined in accordance with Equation (20), which illustrates the first additive component proportional to $\omega_x$ and a second additive component proportional to h.

When forming the control signal which includes the second additive component proportional to the momentum stored in the momentum source, the method further includes a step of sensing the momentum stored in the momentum source. The momentum may be sensed directly using a momentum sensor. Alternatively, the step of sensing the momentum is performed by sensing an angular rate of the momentum source, and generating a signal representative thereof using the tachometer. The processor can then process the signal representative of the angular rate to compute the momentum stored in the momentum source. After forming the control signal, a step of driving the momentum source in dependence upon the control signal is performed, as indicated by block 46.

To compensate for a torque due to friction in the motor, an additional term is introduced to form the desired torque. This additional term is proportional to the angular speed of the momentum source as measured by the tachometer. In particular, the additional term is added to the desired torque as computed using either Equation (7) or Equation (20).

Although presented for a symmetric body model of the spacecraft, embodiments of the present invention can also be employed for an asymmetric body having moments of inertia $I_x$ and $I_y$ about the x and y axes, respectively. An equivalent spin-to-transverse moment of inertia ratio $\sigma_e$ is defined in accordance with the following equation:

$$(\sigma_e-1)^2=(\sigma_x-1)(\sigma_y-1) \quad (39)$$

where $\sigma_x=I_z/I_x$ and $\sigma_y=I_z/I_y$. Further, an effective transverse moment of inertia $I_T$ is defined as:

$$I_T=\sqrt{I_xI_y} \quad (40)$$

The values of $\sigma_e$ and $I_T$ using Equations (39) and (40) may be substituted for $\sigma$ and $I_T$, respectively, in any of the foregoing equations for use in damping nutation in an asymmetric body. In particular, the values of $\sigma_e$ and $I_T$ are substituted for $\sigma$ and $I_T$ in Equations (6), (7) and (20) to compute the desired torque to drive the momentum source.

Figure 3A:
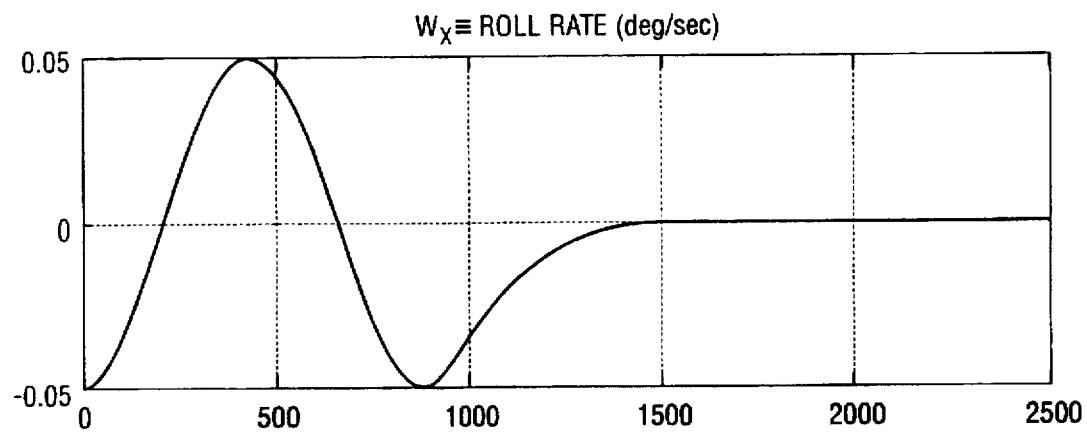
FIGS. 3a–3c are time plots of the roll rate, pitch rate, and yaw rate which result from using angular acceleration feedback.
Figure 3B:
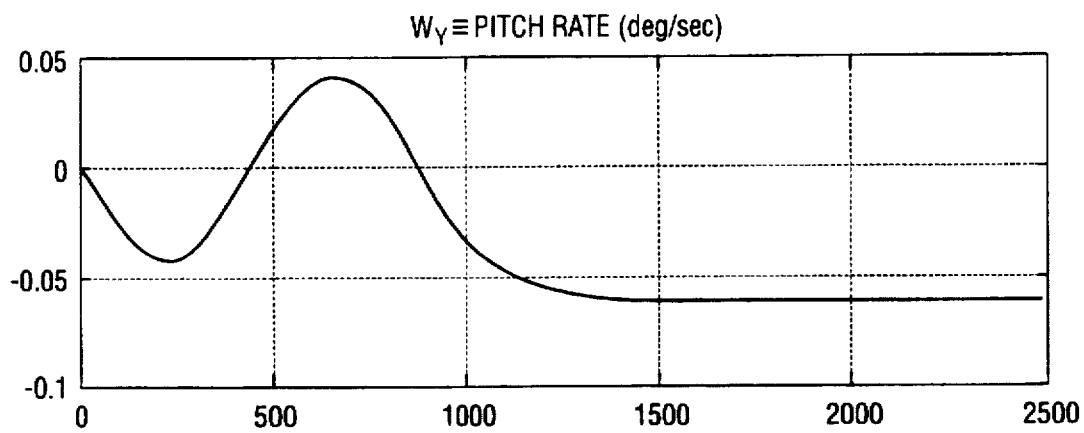
Figure 3C:
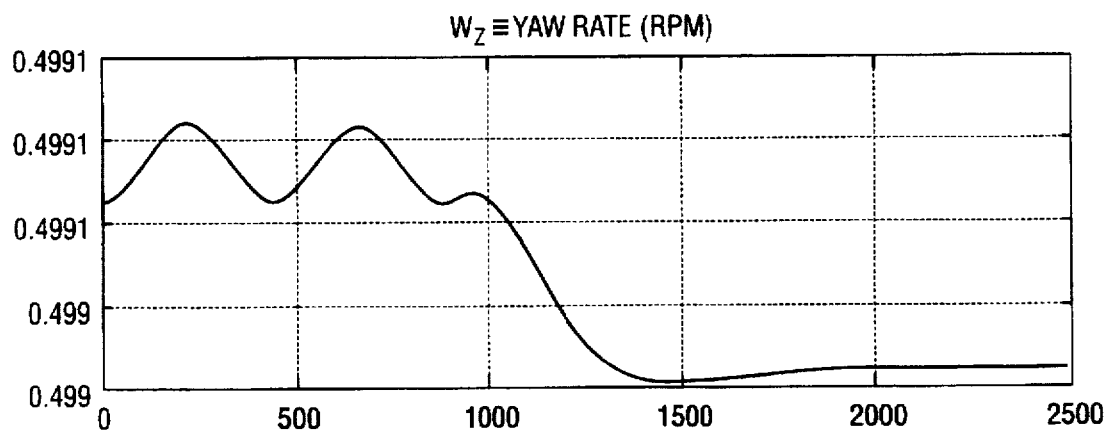

FIGS. 3a–3c are graphs of the roll rate $\omega_x$, the pitch rate $\omega_y$, and the yaw rate $\omega_z$ versus time for an embodiment of the present invention which utilizes only angular acceleration feedback (i.e., only the first additive component). It can be seen that the roll rate $\omega_x$ is critically damped to zero, as shown in FIG. 3a. Further, the pitch rate $\omega_y$ and the yaw rate $\omega_z$ converged to steady state values as illustrated in FIG. 3b and 3c. However, it can be seen that the pitch rate $\omega_y$ converges to a non-zero-value.

Figure 4A:
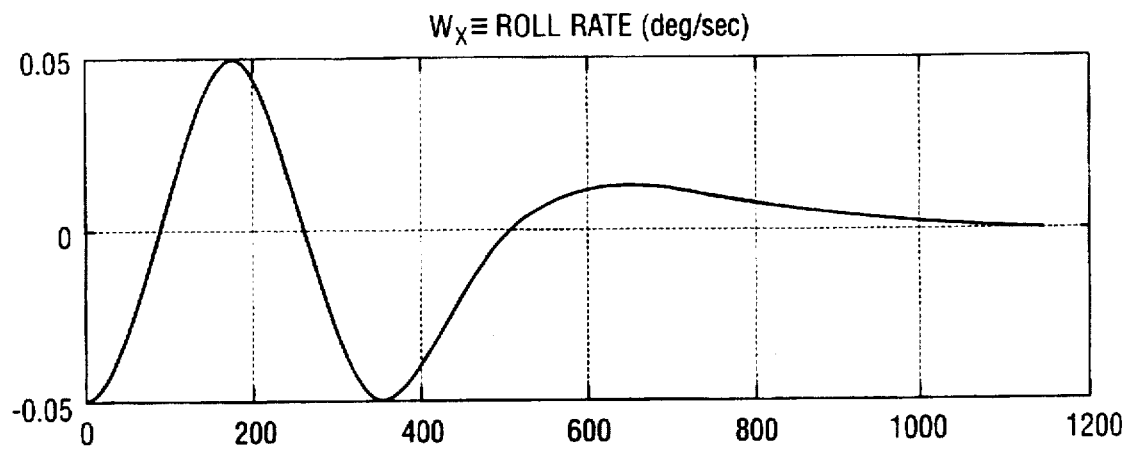
FIGS. 4a–4c are time plots of the roll rate, pitch rate, and yaw rate which result from using both angular acceleration feedback and wheel speed feedback.
Figure 4B:
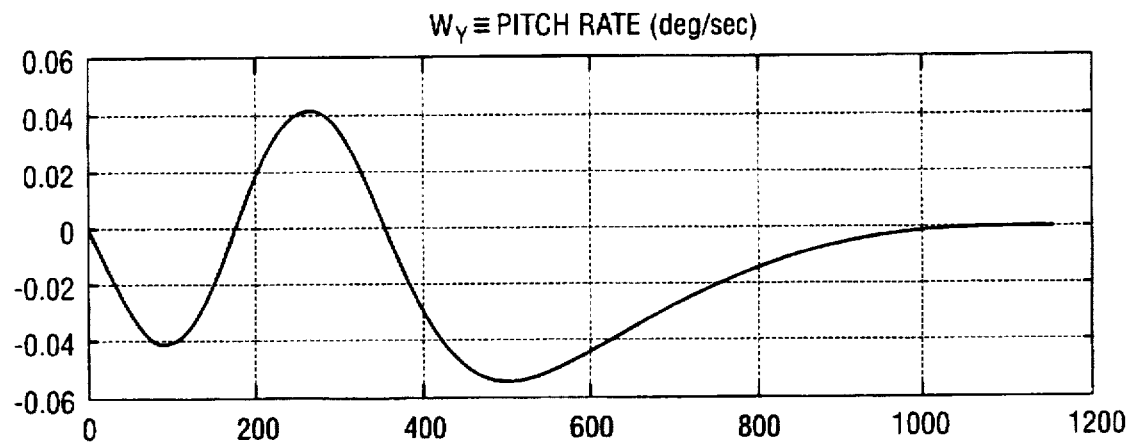
Figure 4C:
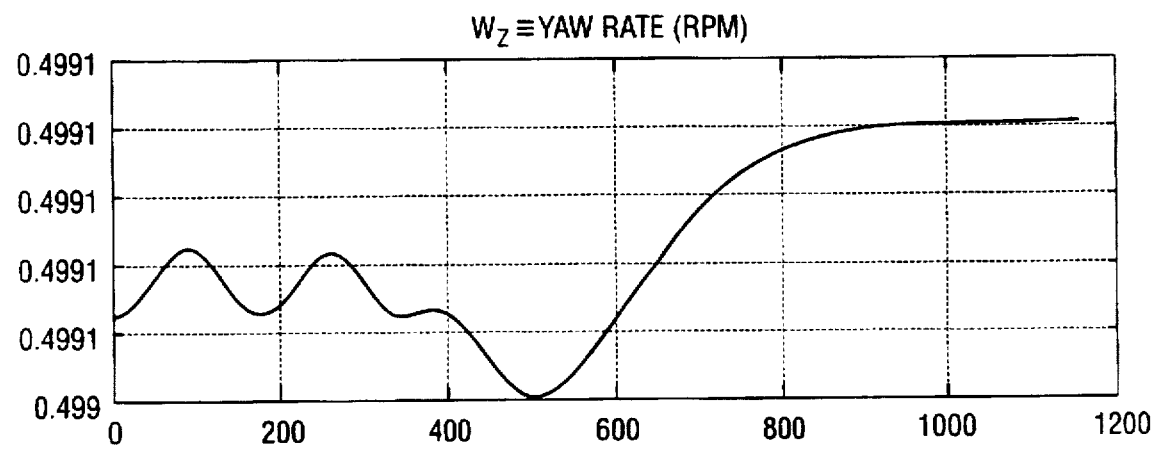

An embodiment of the present invention which utilizes both angular acceleration feedback and wheel speed feedback (i.e., both the first additive component and the second additive component) is demonstrated by the graphs in FIGS. 4a–4c. FIG. 4a shows how the roll rate $\omega_x$ converges to zero. Further, FIG. 4b illustrates how the pitch rate $\omega_y$ also converges to a steady state value of zero. This is the benefit obtained by introducing the feedback of the angular rate of the momentum source.

It is noted that the results depicted in FIGS. 3 and 4 are for embodiments of the present invention used in conjunction with the spin stabilization method and system described in U.S. Pat. No. 5,012,992 to Salvatore, which is hereby incorporated by reference.

Figure 5A:
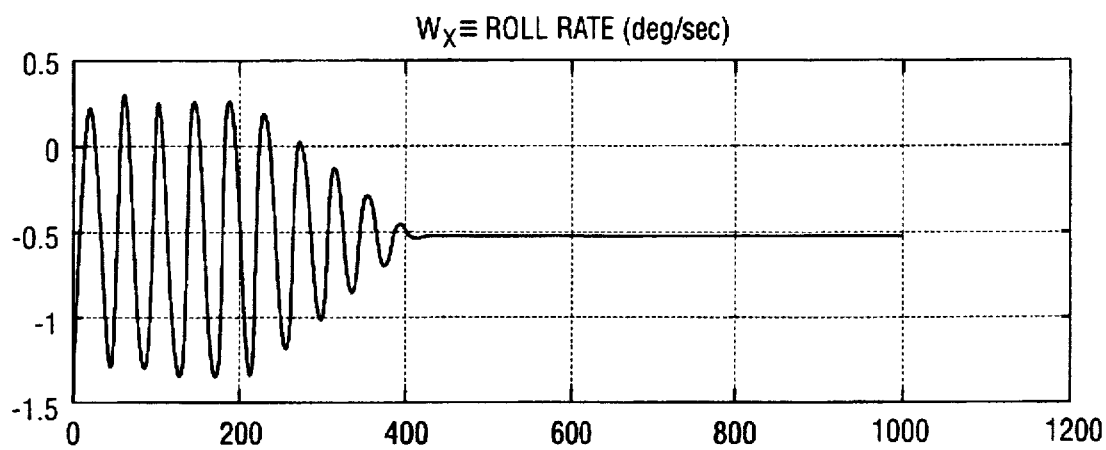
FIGS. 5a–5c are time plots of the roll rate, pitch rate, and yaw rate for a saturated momentum source torque.
Figure 5B:
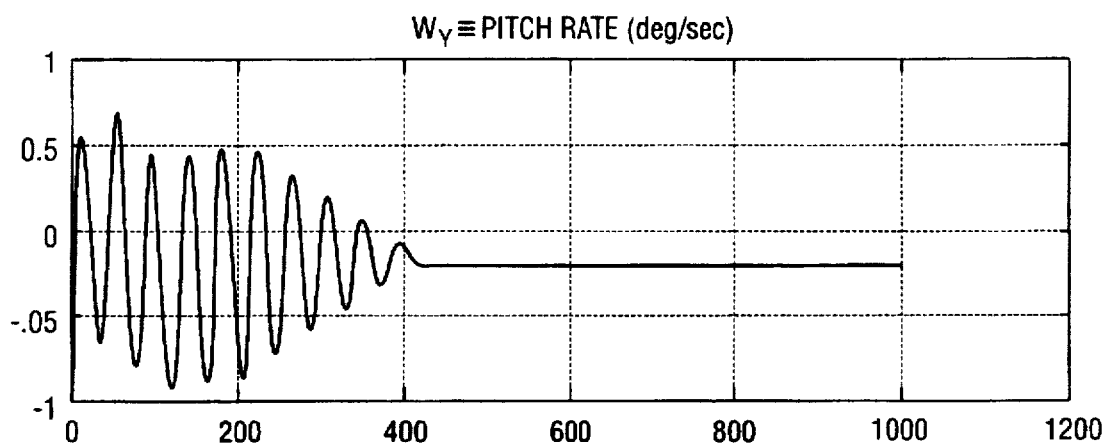
Figure 5C:
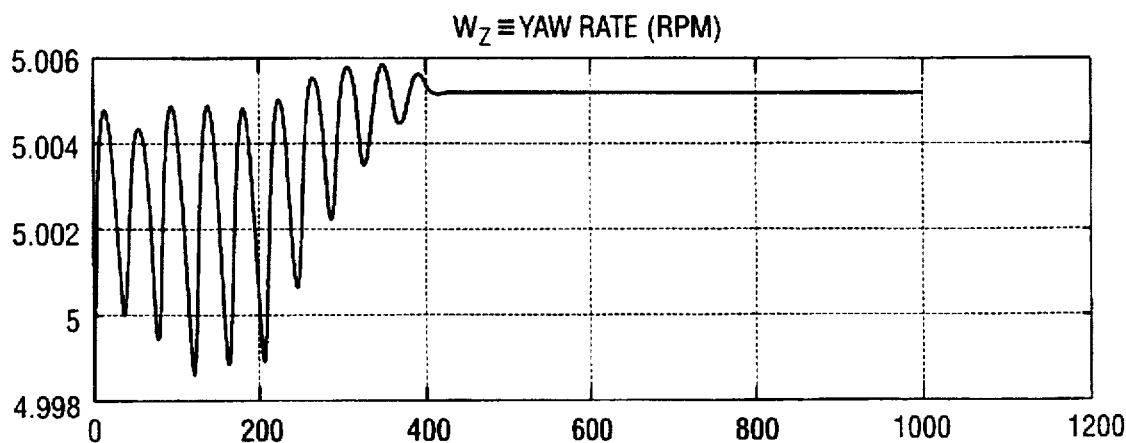

FIGS. 5a–5c demonstrate the performance of an embodiment of the present invention wherein the control signal drives the momentum source into saturation. Particular reference is given to FIG. 5a, which illustrates the linear decay of the envelope of the roll rate during the period at which the momentum source has a saturated torque.

The above-described embodiments of the present invention have many advantages. The disclosed methods and systems act to critically damp nutation to zero as long as the required motor drive control torque does not saturate. In the event of saturation, nutation damps at a linear rate until the required control torque comes out of saturation, at which time nutation damps critically to zero.

Embodiments of the present invention can be applied to the Hughes HS601 spacecraft. Further, the present invention can be utilized in other 3-axis geosynchronous spacecraft having gyros, processors, and momentum wheels aligned with the pitch axis, and spin about the yaw or roll axis during transfer orbit in order to benefit from critical nutation damping.

It is noted that the present invention may be used in a wide variety of different constructions encompassing many alternatives, modifications, and variations which are apparent to those with ordinary skill in the art. Accordingly, the present invention is intended to embrace all such alternatives, modifications, and variations as fall within the spirit and broad scope of the appended claims.

What is claimed is:

1. A method of damping nutation of a spacecraft having a desired spin axis along a first principal inertia axis, the spacecraft having a momentum source oriented along a second principal inertia axis perpendicular to the first principal inertia axis, the method comprising the steps of:

sensing an angular rate of the spacecraft along an axis transverse to both the first principal inertia axis and the second principal inertia axis, and generating an angular rate signal representative of the angular rate;

processing the angular rate signal to form a control signal, the control signal representative of a desired torque to drive the momentum source, the desired torque having a first additive component proportional to a derivative of the angular rate to critically damp the nutation under an at least second order model of the spacecraft, and a second additive component proportional to a momentum stored in the momentum source to inhibit a conversion of the nutation into a tilt of the desired spin axis; and driving the momentum source in dependence upon the control signal.

2. The method of claim 1 wherein the desired torque T is given by:

$$T=-2\frac{|\sigma-1|}{\sigma}I_T\dot{\omega}_x$$

where $\dot{\omega}_x$ is the derivative of the angular rate, $\sigma$ is a spin-to-transverse moment of inertia ratio, and $I_T$ is a transverse moment of inertia.

3. The method of claim 2 wherein $\sigma$ is an equivalent of spin-to-transverse moment of inertia ratio and $I_T$ is an effective moment of inertia for an asymmetric body.

4. The method of claim 1 wherein the desired torque T is given by:

$$T=-2\frac{|\sigma-1|}{\sigma}I_T\dot{\omega}_x-\epsilon|(\sigma-1)\omega_z|h$$

where $\dot{\omega}_x$ is the derivative of the angular rate, $\sigma$ is a spin-to-transverse moment of inertia ratio, $I_T$ is a transverse moment of inertia, $\epsilon$ is a constant, $\omega_z$ is an angular rate about the first principal inertia axis, and h is the momentum of the momentum source.

5. The method of claim 1 further comprising the step of sensing the momentum stored in the momentum source.

6. The method of claim 5 wherein the step of sensing the momentum includes the steps of:

sensing an angular rate of the momentum source, and generating a signal representative of the angular rate; and processing the signal to compute the momentum stored in the momentum source.

7. The method of claim 1 wherein the momentum source includes a momentum wheel driven by a motor.

8. The method of claim 1 wherein the first principal inertia axis is a non-intermediate axis.

9. A method of damping nutation of a spacecraft having a desired spin axis along a non-intermediate, first principal inertia axis, the spacecraft having a momentum source oriented along a second principal inertia axis perpendicular to the first principal inertia axis, the method comprising the steps of:

sensing an angular rate of the spacecraft along an axis transverse to both the first principal inertia axis and the second principal inertia axis, and generating an angular rate signal representative of the angular rate;

sensing the momentum stored in the momentum source;

processing the angular rate signal to form a control signal, the control signal representative of a desired torque to drive the momentum source, the desired torque having a first additive component proportional to a derivative of the angular rate to critically damp the nutation under an at least second order model of the spacecraft, the desired torque having a second additive component proportional to a momentum stored in the momentum source to inhibit a conversion of the nutation into a tilt of the desired spin axis; and driving the momentum source in dependence upon the control signal.

10. A system for damping nutation of a spacecraft having a desired spin axis along a first principal inertia axis, the system comprising:

a momentum source oriented along a second principal inertia axis perpendicular to the first principal inertia axis;

an angular rate sensor which senses an angular rate of the spacecraft along an axis transverse to both the first principal inertia axis and the second principal inertia axis, and generates an angular rate signal representative of the angular rate;

a processor which processes the angular rate signal to form a control signal to drive the momentum source, the control signal driving the momentum source with a desired torque having a first additive component proportional to a derivative of the angular rate to critically damp the nutation under an at least second order model of the spacecraft, and a second additive component proportional to a momentum stored in the momentum source to inhibit a conversion of the nutation into a tilt of the desired spin axis.

11. The system of claim 10 wherein the desired torque T is given by:

$$T = -2 \frac{|\sigma - 1|}{\sigma} I_T \dot{\omega}_x$$

where $\dot{\omega}_x$ is the derivative of the angular rate, $\sigma$ is a spin-to-transverse moment of inertia ratio, and $I_T$ is a transverse moment of inertia.

12. The system of claim 11 wherein $\sigma$ is an equivalent of spin-to-transverse moment of inertia ratio and $I_T$ is an effective moment of inertia for an asymmetric body.

13. The system of claim 10 wherein the desired torque T is given by:

$$T = -2 \frac{|\sigma - 1|}{\sigma} I_T \dot{\omega}_x - \epsilon |(\sigma - 1)\omega_z| h$$

where $\dot{\omega}_x$ is the derivative of the angular rate, $\sigma$ is a spin-to-transverse moment of inertia ratio, $I_T$ is a transverse moment of inertia, $\epsilon$ is a constant, $\omega_z$ is an angular rate about the first principal inertia axis, and h is the momentum of the momentum source.

14. The system of claim 10 further comprising means for sensing the momentum stored in the momentum source.

15. The system of claim 14 wherein the means for sensing the momentum includes:

a tachometer which senses an angular rate of the momentum source, and generates a signal representative of the angular rate;

wherein the processor processes the signal to compute the momentum stored in the momentum source.

16. The system of claim 10 wherein the momentum source includes a momentum wheel driven by a motor.

17. The system of claim 10 wherein the first principal inertia axis is a non-intermediate axis.

\* \* \* \* \*